B. S. AIKMAN.
BRAKE VALVE DEVICE.
APPLICATION FILED FEB. 16, 1915.
1,156,871.
Patented Oct. 19, 1915.
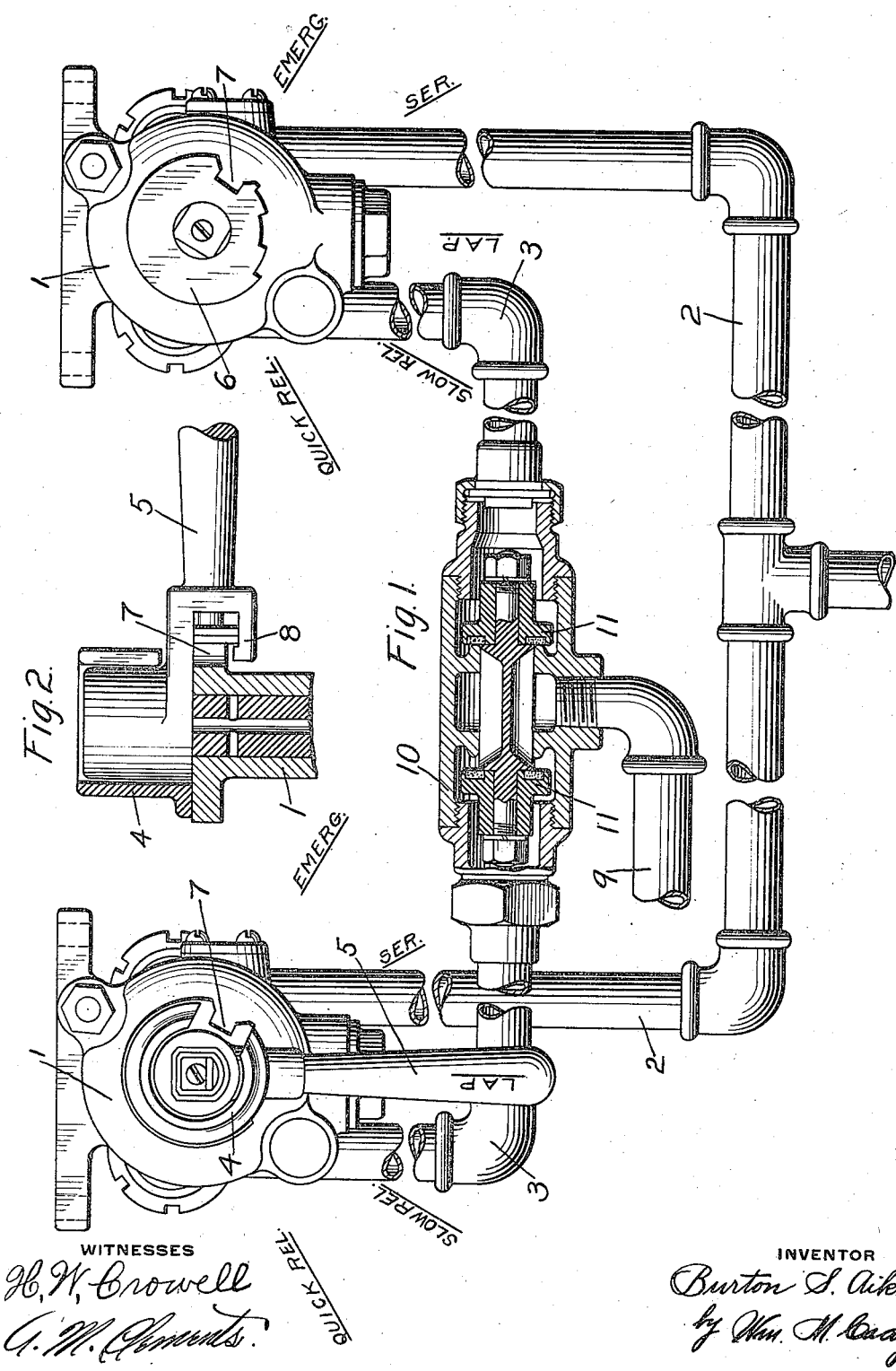
WITNESSES
H. W. Crowell
G. M. Clements
INVENTOR
Burton S. Aikman
by Wm. M. Cady
Att'y.

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

BRAKE-VALVE DEVICE.

1,156,871.   Specification of Letters Patent.   Patented Oct. 19, 1915.

Application filed February 16, 1915. Serial No. 8,466.

*To all whom it may concern:*

Be it known that I, BURTON S. AIKMAN, a citizen of the United States, residing at Milwaukee, in the county of Milwaukee and State of Wisconsin, have invented new and useful Improvements in Brake-Valve Devices, of which the following is a specification.

This invention relates to fluid pressure brakes, and more particularly to a brake equipment for traction service.

Where the so-called double end brake equipment is employed, having a brake valve at each end of the car, when the motorman removes the brake valve handle and goes from one end of the car to the other preparatory to making the return trip, the brakes should first be applied so as to prevent the possibility of the car moving while not under the control of the motorman. If the brakes are not applied under the above conditions, accidents are possible, especially where the end of the line is on a grade, as will be evident.

The principal object of my invention is to provide a brake valve device in which the brake valve handle is removable only in brake application position, so as to insure an application of the brakes whenever the brake valve handle is removed.

In the accompanying drawing; Figure 1 is a diagrammatic view of a portion of a straight air brake equipment with my improvement embodied therein; and Fig. 2 a vertical sectional view of the upper portion of the brake valve employed in the construction shown in Fig. 1.

As shown in Fig. 1 of the drawing, a straight air brake valve 1 is provided at opposite ends of the car and having the usual connections to a reservoir supply pipe 2 and to pipe 3 through which fluid is supplied to and released from the brake cylinder.

According to my invention, a slot in the guard 4 for permitting the removal of the brake valve handle 5 is located at an application position of the brake valve, preferably the emergency application position, as shown in the drawing. The brake valve quadrant 6 is also provided with a slot 7 located at the emergency position of the brake valve and adapted to permit the upward movement of the latch 8 of the brake valve handle when the handle is removed.

Communication from pipe 3 to brake cylinder pipe 9 is controlled by a double check valve device 10 having connected seating valves 11 adapted to close communication from one brake valve when communication is open from the other brake valve to the brake cylinder.

In operation, the parts being in the positions shown in Fig. 1 of the drawing, the brake valve at the right with the handle removed is in emergency application position, so that fluid from the source of supply is admitted to the pipe 3 and maintains the right hand valve 11 of the double check valve device seated. At the opposite end, the brake valve handle 5 may be manipulated in the usual manner to effect the admission of fluid pressure to and its release from the pipe 3. Fluid under pressure can flow to and from the brake cylinder through pipe 9 and around the open left hand valve 11, which is maintained open at all times by the fluid pressure constantly acting on the outer face of the right hand valve 11. Before the motorman can remove the brake valve handle, to go to the other end of the car, the brake valve must first be turned to emergency application position and consequently the brakes are applied before he leaves that end of the car. At the opposite end of the car, the motorman applies the brake valve handle and by turning same to release position, fluid under pressure is released from the right hand pipe 3, so that the fluid pressure now acting on the left hand valve 11 operates to close same and open the right hand valve 11. Fluid is then released from the brake cylinder through pipe 9 and around the right hand valve 11 and the brakes can thereafter be applied and released by manipulation of the brake valve handle in the usual manner.

It will now be seen that the brake valve handle can not be removed without applying the brakes and by employing the double check valve device in the pipe connection to the brake cylinder the brake cylinder pipe volume is reduced approximately one-half and at the same time, flow of fluid from the brake valve with the handle removed to the brake cylinder is prevented.

Having now described my invention, what I claim as new and desire to secure by Letters Patent, is:

1. A brake valve device for fluid pressure brakes having the usual brake application positions and a brake valve handle removable only in one of said application positions.

2. A brake valve device for fluid pressure brakes comprising means for effecting the supply and release of fluid to and from the brake cylinder and a brake valve handle for operating said means and removable only in emergency application position.

3. A brake valve having an emergency application position and provided with a brake valve handle and means for preventing removal of the handle except in emergency position.

4. In a fluid pressure brake, the combination with two brake valves for straight air, and a handle for said valves, removable only in brake application position, of a double check valve operated by the fluid supplied from one brake valve in handle off position for closing communication from that brake valve to the brake cylinder while holding communication open from the other or operating brake valve to the brake cylinder.

In testimony whereof I have hereunto set my hand.

BURTON S. AIKMAN.

Witnesses:
W. K. BOYLE,
THOS. T. BOURS.